J. J. KELLY.
HEATER.
APPLICATION FILED APR. 10, 1909.
928,665.
Patented July 20, 1909.
2 SHEETS—SHEET 1.
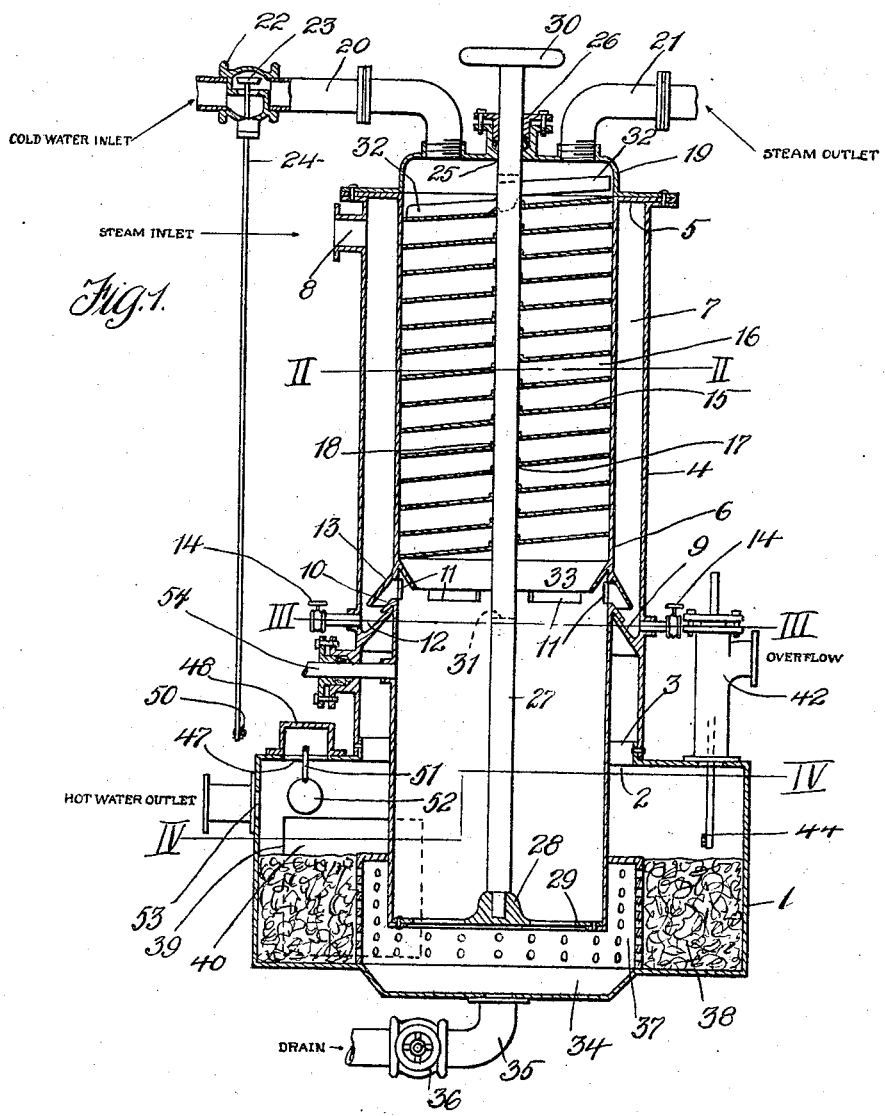

J. J. KELLY.
HEATER.
APPLICATION FILED APR. 10, 1909.
928,665.
Patented July 20, 1909.
2 SHEETS—SHEET 2.
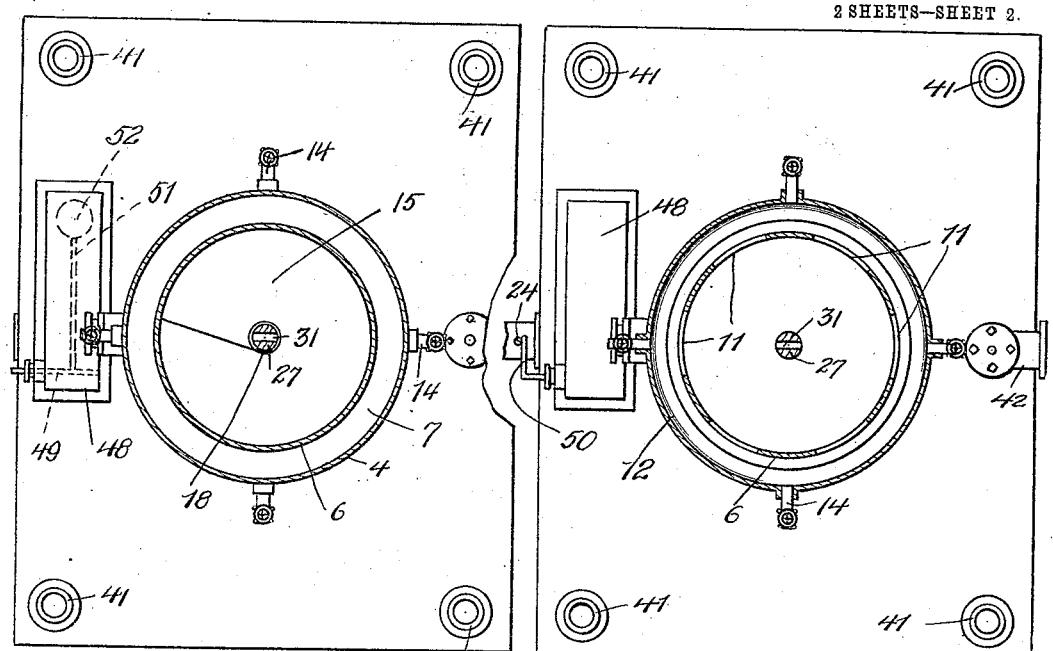
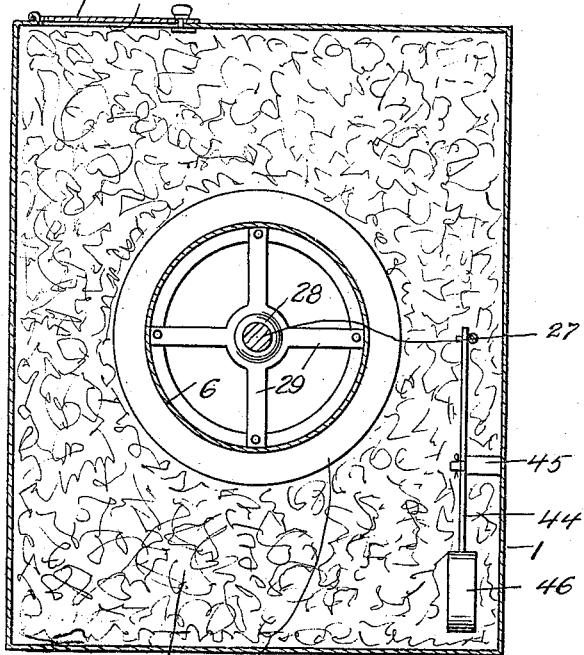
Witnesses
Samuel Payne
K. H. Butler
Inventor
J. J. Kelly.
By H. C. Evertz & Co.
Attorneys

UNITED STATES PATENT OFFICE.

JAMES J. KELLY, OF CRAFTON, PENNSYLVANIA.

HEATER.

No. 928,665.  Specification of Letters Patent.  Patented July 20, 1909.

Application filed April 10, 1909. Serial No. 489,113.

*To all whom it may concern:*

Be it known that I, JAMES J. KELLY, a citizen of the United States of America, residing at Crafton, in the county of Allegheny and State of Pennsylvania, have invented certain new and useful Improvements in Heaters, of which the following is a specification, reference being had therein to the accompanying drawing.
This invention relates to heaters, and more particularly to that type of heater wherein exhaust steam is utilized from steam engines for heating water prior to the same passing into steam boilers.
The objects of my invention are, first, to provide a heater from which mud, sediment, and other matter can be removed during the operation of the heater; second, to provide positive and reliable means in connection with the heater for operating and removing oil from the water fed into the heater, whereby no oil can enter the boilers during the operation of the heater; third, to provide a heater with a large heating surface or area, capable of heating a large amount of water without using a large and cumbersome heater; fourth, to provide a heater with a novel scraper for cleansing the water passage of the heater; fifth, to provide the heater with a filtering material for removing all foreign matter from the heated water prior to the same passing to a boiler; sixth, to provide efficient means for commingling steam and water whereby a maximum amount of water will be thoroughly heated with a minimum amount of steam; and seventh, to provide a simple, durable and easily operated heater that can be maintained in a perfect condition without necessitating discontinuing the operation of the heater.

I attain the above objects by providing a heater wherein the use of coils of tubing is dispensed with, thereby eliminating an expensive element that has heretofore been depended upon as a conduit for steam adapted to heat water surrounding the coils of tubing or as a conduit for water adapted to be heated by steam surrounding the coils, these heaters being commonly known as "interior" and "exterior" heaters, it being almost impossible to maintain the same in a clean condition, especially without placing the heater out of operation.

My invention will be hereinafter considered in detail and then specifically pointed out in the appended claims, and reference will now be had to the drawings forming a part of this application, wherein there is illustrated a preferred embodiment of my invention, but it is to be understood that the structural details thereof can be varied, as to the shape, proportion and manner of assemblage without departing from the spirit and scope of the invention.

In the drawings, Figure 1 is a vertical sectional view of a heater constructed in accordance with my invention, Fig. 2 is a horizontal sectional view of the same taken on the line II—II of Fig. 1, Fig. 3 is a similar view taken on the line III—III of Fig. 1, Fig. 4 is a similar view taken on the line IV—IV of Fig. 1, and Fig. 5 is a longitudinal sectional view of a portion of the heater, illustrating a float valve thereof.

To put my invention into practice, I provide a rectangular metallic casing 1, with a central opening 2, surrounded by a vertical flange 3, and secured to this flange is a vertical cylindrical outer shell 4 upon which rests the upper end 5 of a cylindrical inner shell 6 of less diameter than the outer shell 4 and of greater length, said inner shell extending in proximity to the bottom of the casing 1. The arrangement of the shells 4 and 6 provides an annular steam compartment 7, to which exhaust steam is admitted through an opening 8 adjacent to the upper end of the shell 4. The shell 4 adjacent to the lower end thereof is provided with an interior annular angularly disposed flange 9, adapted to engage under a peripheral angularly disposed flange 10 carried by the inner shell 6, said flange 10 being located directly beneath a plurality of circumferentially arranged oblong openings 11 formed in said inner shell, these openings admitting steam from the annular compartment 7 to the interior of the inner shell 6.

The flange 9 provides an annular trough 12 for collecting oil or foreign matter in the exhaust steam admitted to the heater, and in order to deflect the oil from the openings 11, and prevent the steam from carrying the oil into the shell 6, said shell directly above the openings 11 is provided with a circumferentially arranged deflector 13. The oil or foreign matter that accumulates in the trough 12 is removed through the medium of a plurality of radially disposed drain pipes 14 communicating with the trough 12.

That portion of the inner shell 6 above the openings 11 is provided with a spirally arranged partition 15 providing a spiral passage 16 from the upper end of the shell 6 to the openings 11, said partition having a central vertical opening 17 intersecting the convolutions of the partition 15, the material bordering upon the opening of each convolution being bent upwardly, to provide a flange 18, said flange preventing water passing over the spiral partition 15 from entering the opening 17, and traveling downwardly through said opening, without being subjected to steam passing upwardly through the convolution of the partition, or without contacting with the heated surface of the inner shell 6. The passage of water through the opening 17 is also prevented by an important element of my invention, which will be presently referred to.

Secured upon the closed upper end 5 of the shells 4 and 6, is a cover 19, and connected to said cover is a water inlet pipe 20 and an exhaust steam outlet pipe 21, said pipe 20 being provided with a valve body 22 having a valve 23 provided with a depending valve stem 24, the object of which will hereinafter appear.

The cover 19 is provided with a stuffing box 26. Extending through the stuffing box 26, opening 25 and the opening 17 of the partition 15 is a vertical shaft 27, having the lower end thereof revolubly supported in a bearing 28 carried by a spider 29 secured to the lower end of the inner shell 6. The upper end of the shaft 27 is provided with a hand wheel 30, and that portion of the shaft between the cover 19 and the openings 11 of the shell 6 is provided with a longitudinal slot 31, for a scraper having arms 32, adapted to rest upon the convolutions of the partition 15, said scraper being carried from one end of the partition to the other, by rotating the shaft 27, it being understood that one of the arms of the scraper remains in one of the convolutions of the partition 15, in order that said scraper can be easily started upon its downward or upward path. This scraper forms an important characteristic of my invention, as it is possible therewith to remove sediment and foreign matter that might accumulate upon the convolutions of the partition 15 and retard or eventually stop the passage of steam and water in the sinuous path 16. It is obvious that the scraper can be easily operated without placing the heater out of commission, and to prevent any of the removed sediment or foreign matter from entering the openings 11 of the shell 6, said shell at the lower end of the partition 15 is provided with an inwardly projecting annular deflector 33, this deflector also preventing water from entering said openings.

The casing 1 is provided with a central depending catch basin 34 having a drain pipe 35 provided with a valve 36. The catch basin 34 is surrounded by a perforated cage 37 having a closed top encircling the shell 6 and arranged between the cage 37 and the outer walls of the casing 1 is a suitable filtering material 38, as sand, gravel, charcoal, etc. The casing at one side thereof is provided with an opening 39 whereby the filtering material can be removed and renewed, said opening being normally closed by a door 40. In order that the filtering material 38 can be flushed or washed, the top of the casing 1 is provided with a plurality of pipe connections 41, whereby water can be admitted on top of the filtering material to wash foreign matter out of the same into the catch basin 34, from where the same can be removed through the pipe 35 by opening the valve 36.

The top of the casing 1, at one side thereof, is provided with an overflow pipe 42, having a valve 43 actuated by a float lever 44 fulcrumed within the casing 1 and above the filtering material 38, as at 45, said lever having a float 46. The object of the valve 43 is to prevent steam from escaping through the overflow pipe 42 when the water is low in the casing 1. The opposite side of the casing 1 is provided with an opening 47 closed by a housing 48. In the housing 48 is journaled a shaft 49 having one end protruding from said housing, and provided with a crank 50, said crank being connected to the vertical valve rod 24. The shaft 49 within the housing 48, is provided with a curved arm 51, having a float 52. The side of the casing 1 is provided with an outlet opening 53, for filtered and heated water.

Should oil escape into the shell 6, the oil can be drawn off of the water within said shell, through the medium of a pipe 54.

Operation: Assuming that water is admitted to the heater through the pipe 20, and steam through the pipe 8, the water travels downwardly in the spiral path 16, to the bottom of the shell 6 and through the perforated cage 37 and is withdrawn for use in steam boilers through the opening 53. During the passage of water through the spiral path 16, it encounters the steam admitted through the pipe 8 and is thoroughly heated before the steam escapes through the outlet pipe 21. Should the water in the casing 1 rise between the shells 4 and 6, to a height or level with the overflow pipe 42, the water will overflow, and should the water become low in the casing 1, the floats 46 and 52 will immediately actuate the valves 43 and 23, preventing steam from escaping from the heater, and allowing water to enter the heater through the valve 22.

When it is desired to remove mud and foreign matter from the catch basin 34, it is only necessary to open the valve 36. It is during this operation that the scraper can be operated to an advantage, also the filtering material 38 cleaned. The valve 22 closes when the water in the heater starts to overflow, consequently, the overflow pipe 42 can be dispensed with, if desired.

Having now described my invention, what I claim as new, is;—

1. A water heater, comprising an outer and inner shell, providing an annular steam compartment between said shells, said inner shell having a spiral water and steam path formed therein, and means movable in said path for removing foreign matter from said path.

2. A water heater, comprising an outer and inner shell, providing an annular steam compartment between said shells, said inner shell having a spiral water and steam path formed therein, means movable in said path for removing foreign matter therefrom, and means located between said shells for removing oil from steam admitted to said annular steam compartment.

3. A water heater, comprising an outer and inner shell, providing an annular steam compartment between said shells, said inner shell having a spiral water and steam path formed therein, and means movable in said path for removing foreign matter therefrom, said means including a slotted shaft and a scraper loosely mounted in said shaft.

4. A water heater, comprising an outer and inner shell, providing an annular steam compartment between said shells, said inner shell having a spiral water and steam path formed therein, means movable in said path for removing foreign matter therefrom, means located between said shells for removing oil from steam admitted to said annular steam compartment, said means comprising an annular trough and pipes communicating with said trough.

5. A water heater, comprising a casing, an inner and outer shell supported by said casing and communicating therewith, means for conveying water and steam in a spiral path through said inner shell, means disposed to be moved through said path for removing foreign matter therefrom, and means located in said casing for filtering water from said inner shell.

6. A water heater, comprising a casing, an inner and outer shell supported by said casing and communicating therewith, means for conveying water and steam in a spiral path through said inner shell, means located in said casing for filtering water from said inner shell, and means between said shells for removing oil from steam entering said inner shell.

7. A water heater, comprising a casing adapted to contain a filtering material, shells supported by said casing, and providing an annular steam compartment, a spiral partition arranged in one of said shells and providing a spiral path for water and steam through said heater, a scraper movably arranged upon said partition for removing foreign matter therefrom, means for collecting and removing foreign matter from said casing, and means in connection with said shells for removing oil from steam and water within said shells.

8. A heater of the type described, comprising a casing adapted to contain a filtering material, shells supported by said casing, means for carrying steam and water through a spiral path within one of said shells, means interposed between said shells for removing oil from steam prior to entering said path, and means in connection with said shells and said casing for removing foreign matter accumulated in said shells and casing, said means including a scraper, a catch basin, and a drain pipe in connection with said basin.

9. A heater of the type described, comprising a casing having an outlet opening, inner and outer shells carried by said casing and providing a steam compartment between said shells, a cover carried by said shells, a water pipe connecting with said cover, a partition arranged in said inner shell and providing a spiral path for water admitted to said shell, said inner shell having openings formed therein to admit steam from said compartment, a scraper movable in the spiral path formed by said partition, and means for moving said scraper.

10. A heater of the type described, comprising a casing, said casing having an outlet opening formed therein, an outer shell carried by said casing, said shell having a steam inlet opening formed therein, an inner shell arranged in said outer shell and providing a steam compartment between said shells, said inner shell having openings formed therein admitting steam from said compartment to said inner shell, a spiral partition mounted in said inner shell and providing a spiral path for steam, a cover mounted upon said shells, a water pipe connecting with said cover, a scraper movable in the path formed by said partition, means for moving said scraper, means for filtering water in said casing, and means for removing oil from the water prior to being filtered.

11. A heater of the type described, comprising a casing, said casing having an outlet opening formed therein, an outer shell carried by said casing, said shell having a steam inlet opening formed therein, an inner shell arranged in said outer shell and providing a steam compartment between said shells, said inner shell having openings formed therein admitting steam from said compartment to said inner shell, a spiral partition mounted in said inner shell and providing a spiral path for steam, a cover mounted upon said shells, a water pipe connecting with said cover, a scraper movable in the path formed by said partition, means for moving said scraper, and means for filtering water in said casing.

12. A heater of the type described, comprising a casing, said casing having an outlet opening formed therein, an outer shell carried by said casing, said shell having a steam inlet opening formed therein, an inner shell arranged in said outer shell and providing a steam compartment between said shells, said inner shell having openings formed therein admitting steam from said compartment to said inner shell, a spiral partition mounted in said inner shell and providing a spiral path for steam, a cover mounted upon said shells, a water pipe connecting with said cover, a scraper movable in the path formed by said partition, and means for moving said scraper.

13. A heater embodying a casing having a depending catch basin provided with a drain pipe, an outer vertical shell supported by said casing, an inner shell arranged within said outer shell and extending downwardly in proximity to said catch basin, a perforated cage surrounding the lower end of said inner shell and providing a filter compartment between said cage and the side walls of said casing, said outer shell having a steam inlet opening formed therein, said inner shell having circumferentially arranged openings formed therein, a cover arranged upon the upper ends of said shells, a cold water inlet pipe connecting with said cover, a steam outlet pipe connecting with said cover, a valve carried by said water inlet pipe, a float arranged within said casing for actuating said valve, an overflow pipe carried by said casing, a valve arranged in said overflow pipe, a float arranged within said casing for actuating the valve of said overflow pipe, a spiral partition arranged in said inner shell and providing a spiral path, a shaft extending centrally through said partition, a scraper movable with said shaft and adapted to travel in said spiral path, a pipe connecting with said inner shell for withdrawing oil from water within said shell, and said casing having a hot water opening therein.

14. A heater embodying a casing having a depending catch basin provided with a drain pipe, an outer vertical shell supported by said casing, an inner shell arranged within said outer shell and extending downwardly in proximity to said catch basin, a perforated cage surrounding the lower end of said inner shell and providing a filter compartment between said cage and the side walls of said casing, said outer shell having a steam inlet opening formed therein, said inner shell having circumferentially arranged openings formed therein, a deflector carried by said inner shell above said openings, a flange carried by the inner side of said outer shell directly beneath said deflector and providing an annular oil trough, a cover arranged upon the upper ends of said shells, a cold water inlet pipe connecting with said cover, a steam outlet pipe connecting with said cover, a valve carried by said water inlet pipe, a float arranged within said casing for actuating said valve, an overflow pipe carried by said casing, a valve arranged in said overflow pipe, a float arranged within said casing for actuating the valve of said overflow pipe, a spiral partition arranged in said inner shell and providing a spiral path, a shaft extending centrally through said partition, a scraper movable with said shaft and adapted to travel in said spiral path, a deflector carried by said inner shell below said spiral partition, a pipe connecting with said inner shell for withdrawing oil from water within said shell, and said casing having a hot water opening therein.

15. In a water heater, a casing having a depending catch basin provided with a drain pipe, an outer vertical shell supported by said casing, an inner shell extending below the lower end of the outer casing and into proximity to the catch basin, a perforated cage surrounding the lower end of said inner shell and providing a filter compartment between said cage and the side walls of the casing, said outer shell having a steam inlet and said inner shell having openings formed therein intermediate its ends, a cold water inlet pipe communicating with said inner shell, a steam outlet pipe also communicating with said inner shell, a partition within the inner shell disposed to form a spiral path within said shell, and means movable in said spiral path for removing foreign matter therefrom.

16. In a heater of the type described, a casing having an outlet opening, an outer shell carried by said casing and provided intermediate its ends with an interior supporting flange, an inner shell arranged within the outer shell with its lower end extending beyond the lower end of the outer shell and into said casing, said inner shell provided with an exterior flange engaging the supporting flange of the outer shell, said outer shell having a steam inlet and said casing having a hot water outlet, a cold water inlet pipe communicating with the inner shell, and a steam outlet pipe also communicating with said inner shell.

17. In a heater of the type described, a casing having an outlet opening, an outer shell carried by said casing, an inner shell disposed within the outer shell and spaced therefrom to provide a steam compartment between the outer and inner shells, the said inner shell provided intermediate its ends with openings, a trough arranged in the steam space below the said opening, a partition within the inner shell arranged to form a spiral path within said shell, a cold water inlet pipe communicating with said inner shell, and a steam outlet pipe also communicating with said inner shell.

In testimony whereof I affix my signature in the presence of two witnesses.

JAMES J. KELLY.

Witnesses:
GEO. H. BELTZHOOVER,
W. R. ADAMS.